United States Patent [19]

Kell

[11] 4,221,272
[45] Sep. 9, 1980

[54] TRACKED VEHICLE SUSPENSION
[75] Inventor: Ralph W. Kell, Lincoln, Nebr.
[73] Assignee: The Goodyear Tire & Rubber Company, Akron, Ohio
[21] Appl. No.: 944,486
[22] Filed: Sep. 21, 1978
[51] Int. Cl.² .................. B62D 55/08; B62M 27/02
[52] U.S. Cl. ........................ 180/190; 180/9.2 R; 180/9.62; 305/47
[58] Field of Search ................. 180/5 R, 9.2, 9.62, 180/9.64; 305/33, 26, 38, 39, 47

[56] References Cited
U.S. PATENT DOCUMENTS

| 2,592,542 | 4/1952 | Curtis | 305/33 |
| 3,784,263 | 1/1974 | Hendrickson et al. | 180/5 R |
| 3,934,944 | 1/1976 | Forsgren | 305/38 |

FOREIGN PATENT DOCUMENTS 1181920  6/1959  France ................. 305/38

Primary Examiner—John J. Love
Assistant Examiner—Donn McGiehan
Attorney, Agent, or Firm—D. M. Ronyak

[57] ABSTRACT

A suspension for tracked vehicles includes at least one belt positioned along the inside pathway of the track, engaging the track, moving at the same speed as the track, and supporting the ground engaging portion of the track to provide a resistance to backbending as the track conforms to the terrain.

16 Claims, 4 Drawing Figures

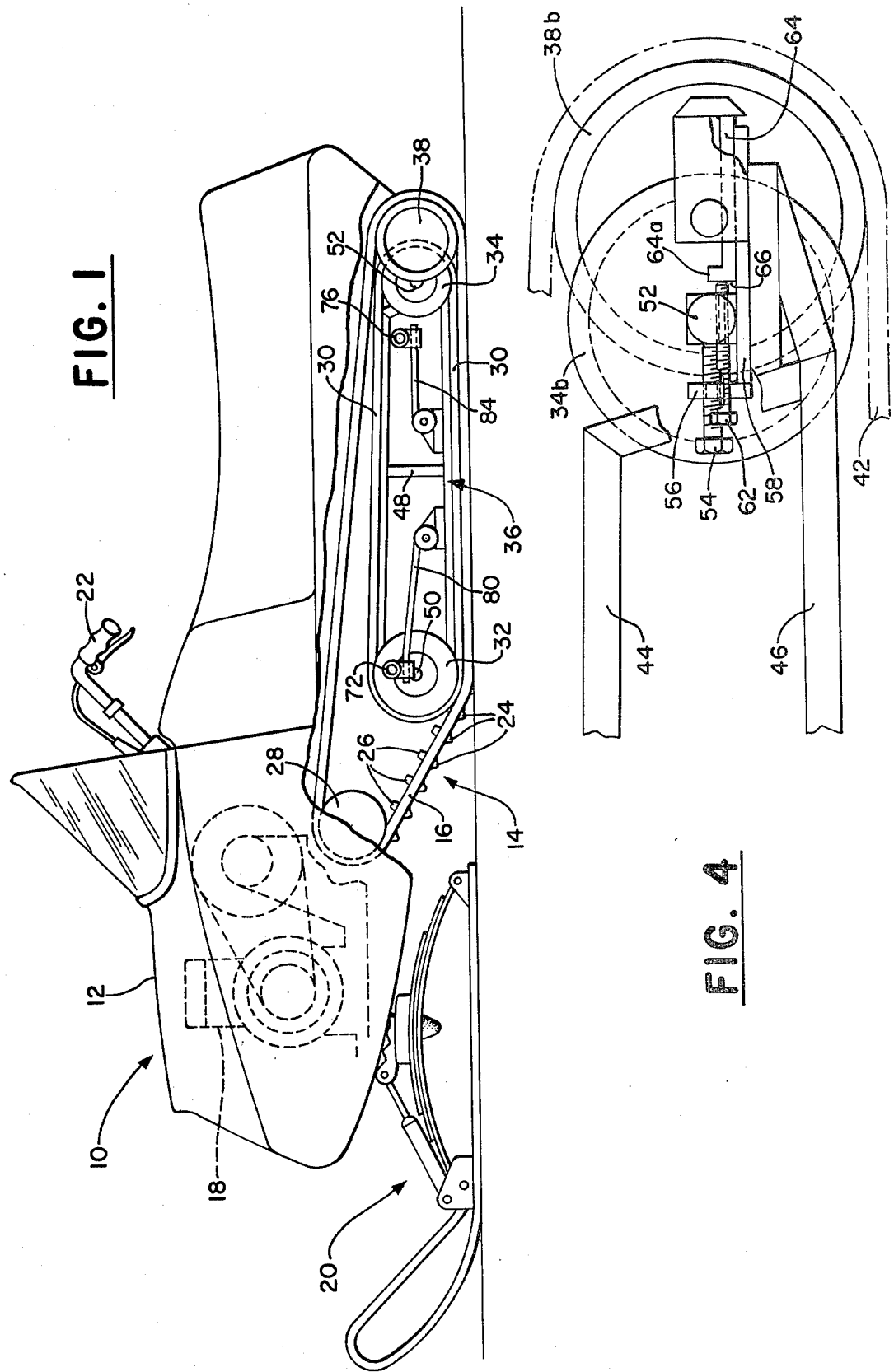

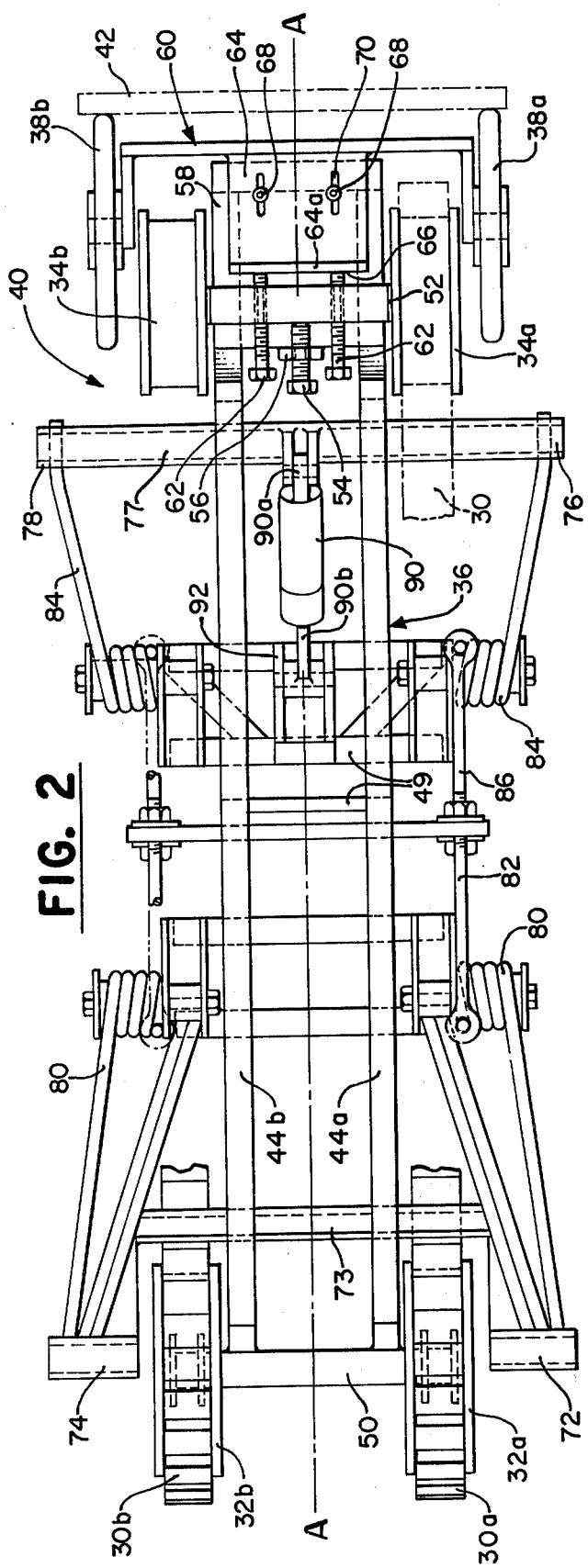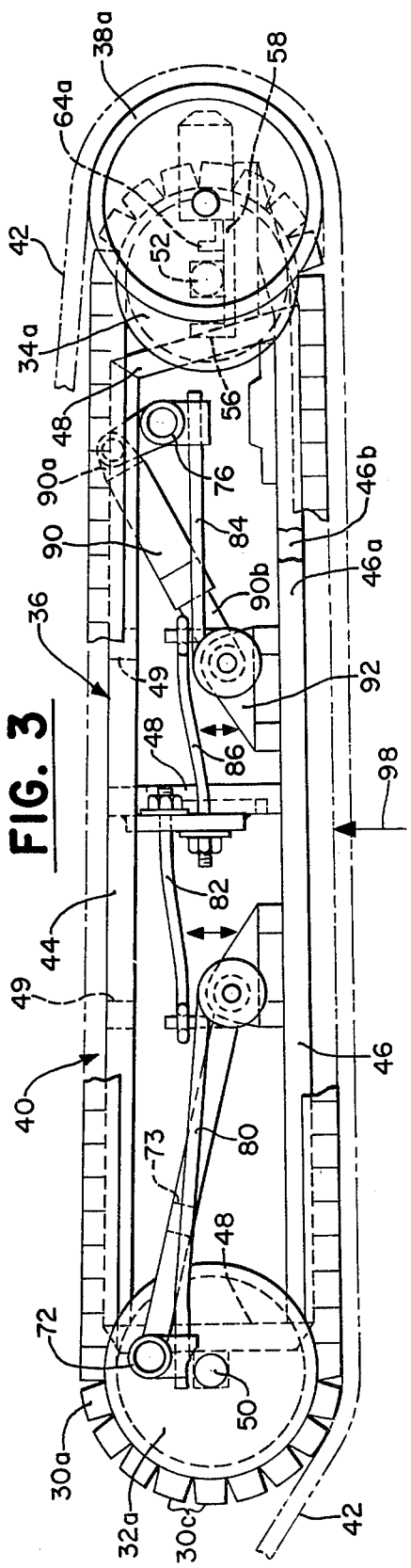

TRACKED VEHICLE SUSPENSION

BACKGROUND OF THE INVENTION

This invention generally relates to track laying vehicles and more particularly to suspensions for tracked vehicles such as, for example, snowmobiles and the like.

In the suspension of tracked vehicles, bogie wheel as well as slide-type suspensions or combinations thereof, are generally well known and used in the industry. A bogie wheel suspension is costly by virtue of the number and complexity of mechanical parts and is an inefficient system in deep snow due to the high rolling resistance of the small bogie wheels. A slide suspension is less costly than the bogie wheel suspension and is more efficient in deep snow giving more support and stability to the vehicle, but it must have snow for a lubricant and for cooling of the rub surfaces between the slide rail and track. Therefore, it is not suitable for use on ice, hard-packed snow, or where dry ground conditions exist. Furthermore, the track must be configured with rub surfaces, such as for example, metal clips and the like, to lower the coefficient of friction between the track and the slide. Such modifications to the track naturally increase its cost.

These and other factors and influences have been limitations to the useful operational range of this type vehicle and it is, therefore, a primary object of the instant invention to provide a suspension for tracked vehicles that is operationally simple, easily adapted to presently designed vehicles and is not limited by a lack of snow or other lubrication or by the operating conditions. Still another object is to provide a suspension that allows for the use of a much simplified track having no requirement for embedded metal slide surfaces and the like.

In its broad aspect, the invention envisions a belt-type suspension wherein one or more belts are supported by one or more pulleys, which belt or belts operate in conjunction with the vehicle track to hold the track to the ground as it rolls over the terrain. More specifically, the invention provides a belt-type suspension that is mounted in a relative position to the track, on its inside pathway between the track drive and adjusting pulleys and in engagement with the track to run at the same speed as the track. Belts of the type alluded to that may be applied to the suspension that is the subject of this invention are described in a copending application Ser. No. 944,485 filed concurrently herewith and entitled, Anti-Backbend Belts. The teaching of said application is incorporated by reference herein and the subject belts may be applied to the suspension of this invention when an anti-backbend characteristic is required, as will be more fully appreciated from the detailed description that follows.

DESCRIPTION OF THE DRAWINGS

FIG. 1 is a side elevational view with portions broken away showing a tracked vehicle and the suspension that is the subject of this invention;

FIG. 2 is a top plan view with portions broken away of the suspension shown in FIG. 1;

FIG. 3 is a side elevational view with portions broken away of the belt suspension shown in FIG. 2; and FIG. 4 is an enlarged elevational view of the rear portion of the suspension showing the belt and track pulley tension adjustment.

BRIEF DESCRIPTION OF THE INVENTION

Referring to FIG. 1, a tracked vehicle of the snowmobile type is generally indicated by reference numeral 10 and generally comprises a body 12 on a suspension 14 that carries a flexible track 16 driven by a motor 18. The vehicle normally also includes a front steering mechanism 20 controlled by the operator through handle grips 22. This invention is particularly directed to the suspension 14 that carries the vehicle body 12 and track 16 and, therefore, is not considered limited by the particular vehicle configuration shown in the drawing. The track 16 normally comprises a reinforced elastomeric belt having ground-engaging grousers 24 located on the outwardly facing surface and in a transverse orientation to the direction of travel of the track and drive lugs 26 on the inside surface thereof for engagement with a drive pulley 28 associated with the drive motor 18 through a conventional transmission (not shown). At the rearward end of the vehicle the track 16 is passed around pulleys 38 that are adjustably mounted for tension control of the track.

In accordance with this invention, the suspension 14 comprises one or more belts 30 mounted on a pair of pulleys 32, 34 on a framework 36 that provides mounting and cushioning means for the vehicle body 12. The framework 36 is positioned on the longitudinal axis of the vehicle and is positioned such that the belts 30 engage the snow track 16 along its bottom inside surface. Thus, it must be appreciated that the snow track 16 is driven by the motor 18 through a typical transmission and drive pulley 28 and engages a suspension belt 30 which rolls at the same speed as the track 16.

Referring to FIGS. 2 and 3, the suspension of this invention is generally indicated by reference numeral 40. Conventional snowmobiles generally utilize a single track 42 (shown in ghost lines) that is approximately 15 inches in width and is characterized by a plurality of grouser bars 24 on its outside surface. As clearly shown in FIG. 2, the suspension 40 may comprise two belts 30a and 30b in parallel aligned position with the longitudinal axis A—A of the track 42.

The framework 36 is generally rectangular having upper and lower horizontal braces 44 and 46, respectively, and a plurality of substantially vertical braces 48 and cross braces 49 positioned within the framework where needed for the strength integrity of the suspension. The framework 36 carries a front axle 50 and a rear axle 52, the front axle supporting suspension belt pulleys 32a and 32b while the rear axle supports suspension belt pulleys 34a and 34b. Of course, the pulleys are all bearing or bushing-mounted following well known practice in the industry. As more clearly shown in FIG. 4, the rear axle 52 is horizontally adjustable within the framework 36 to provide tension adjustment of the suspension belts 30 and this adjustment is effected through at least one adjusting bolt 54 that is threaded through a vertical flange 56 that is welded to a base plate 58. The base plate 58 is rigidly attached to the framework by welding or the like. The rearward portion of the framework 36 also carries a yoke structure generally indicated by reference numeral 60 that supports the track pulleys 38a and 38b. The yoke is horizontally adjustable to provide tension control of the track 42 and this adjustment is effected through adjusting bolts 62 that are threaded through the rear axle 52 to abut a vertical flange 64a on a yoke-mounting plate 64 such as at 66 in FIGS. 2 and 4. The yoke-mounting plate 64 is secured to the base plate 58 by reason of bolts 68 that are mounted in slots 70 in the plate 64 such that by turning down the adjusting bolts 62 the yoke assembly 60 is moved rearwardly to increase the tension on the track 42. When the proper track tension is realized, the bolts 68 are tightened down to rigidly hold the plate 64 in place.

The vehicle body 12 is attached to the suspension 40 at two forward mounts 72 and 74 interconnected by a cross-member 73 and two rearward mounts 76 and 78 interconnected by a cross-member 77. The body attachments are made through conventional bushing mounts, and the forward bushing mounts 72, 74 are attached to the lower framework braces 46 through suspension springs 80. The spring rate of each spring 80 is adjustable by reason of connecting rods 82 in a well-recognized manner. In similar fashion, the rearward body mounts 76, 78 are connected to the framework lower braces 46 through suspension springs 84 which have their spring rate adjusted through rods 86. The rearward vehicle mounting assembly is further isolated from shock by virtue of a conventional shock absorber 90 that has its piston end 90a attached to the cross-member 77 while the piston rod end 90b is connected to a framework cross-brace 49 through mounting brackets 92.

As herebefore mentioned, the suspension is positioned on the inside pathway of the snowtrack 16 such that the suspension belts 30 engage the track on its bottom inside surface. The belts 30 may be any of the configurations described in Applicant's copending application or any other type of rubber, plastic or chain link belt which may be used to support the track in an anti-backbending mode. For example, the belts 30a and 30b shown in FIGS. 2 and 3 are a simple form of anti-backbend belt characterized in that the tension cords of the belt are located closest to the inside surface of the belt, which surface engages the pulleys 32 and 34. In this circumstance, the compression compound of the belt faces outwardly, comprises at least 50% of the total surface-to-surface thickness of the belt, and is siped to form blocks 30c of substantially imcompressible material such that the belts are sufficiently flexible to pass around the pulleys 32, 34 but when in the area between the pulleys and in a straightened condition, the blocks of incompressible material are in an end-to-end abutting relationship and resist a load force exerted in the direction of arrow 98. This is the direction of loading on the suspension belts by the track as it conforms to the terrain. In other configurations, to accomplish an anti-backbending characteristic, the belts 30 may have cut-out portions or notches that match the sequence and engage the drive lugs 26 on the inside surface of the track 16. In this circumstance, the engagement of the lugs with the suspension belt and the separation of the tension cords of the two results in a resistance to back-bending and an anti-backbending characteristic is accomplished that provides support for the track and effects its conforming to the terrain over which it travels.

Further, and while the invention is shown and described with respect to the use of two belts 30a and 30b, it will become apparent to those skilled in the art that a single belt may be applied in a similar manner. For example, a single wider belt that possess an anti-backbend characteristic may be mounted centrally along the longitudinal axis of the framework 40 such as to engage and support the track along its central area. In this circumstance, the track pulley adjustment may be through a modified yoke wherein the adjusting bolts are positioned outside of the width of the suspension belt.

While certain representative embodiments and details have been shown for the purpose of illustrating the invention, it will be apparent to those skilled in this art that various changes and modifications may be made therein without departing from the spirit or scope of the invention.

What is claimed is:

1. In a track type vehicle having a body with forward and rearward ends, steering means mounted at the forward end, an endless flexible reinforced elastomeric track having an inside surface and ground engaging outside surface positioned on the longitudinal axis of the vehicle for propelling the vehicle, motor and drive means mounted on said body for engagement with and to drive the track, a suspension system associated with the track and the vehicle body comprising:

a framework having forward and rearward ends positioned on the longitudinal axis and within the inside pathway of the track;

mounting means connected on either side of the framework at the forward and rearward ends for attaching the framework to the vehicle body;

a first axle and pulley means mounted at the forward end of the framework;

a second axle and pulley means mounted at the rearward end of the framework;

means at the rearward end of the framework for mounting track engaging pulleys and positioned outside and rearwardly of the second axle pulleys; and at least one endless belt mounted between the first and second axle pulleys and engaging the track on its bottom inside surface so as to be driven at substantially the same speed as the track;

said vehicle track having drive lugs on its inside surface and said belt mounted between first and second axial pulleys comprising high modulus tensile cords embedded therein nearer the inside surface, and a layer of substantially incompressible material forming the outside surface, said belt having a plurality of notches formed therein in an alignment and sequence to receive and interlock with the drive lugs on the inside surface of the track, said interlocked suspension belt notches and track drive lugs and the separation of the tensile cords of both the belt and track combining to effect a resistance to back-bending such that the track conforms to the terrain over which it passes.

2. The suspension as set forth in claim 1 wherein at least two endless belts are mounted between first and second axle pulleys and positioned on opposite sides of the longitudinal axis to engage the bottom inside surface of the track.

3. The suspension as set forth in claim 1 wherein the mounting means for attaching the framework to the vehicle body comprises a pair of bushing mounts interconnected by a cross member at either side of the forward end of the framework and attached to the framework through spring means, and a pair of bushing mounts interconnected by a cross member at either side of the rearward end of the framework and attached to the framework through spring means, said bushing mounts and spring means co-acting to absorb shock to the body from the suspension as the vehicle passes over the terrain.

4. The suspension as set forth in claim 3 wherein the mounting means further comprises at least one shock absorber mounted between the framework and the rearward cross member to further isolate the rearward portion of the body from shocks to the suspension.

5. The suspension as set forth in claims 3 or 4 wherein the spring rate of the spring means is adjustable.

6. The suspension as set forth in claim 1 wherein the means at the rearward end for mounting track engaging pulleys comprises a yoke structure having a central member adjustably mounted to the framework transversely to the longitudinal axis thereof, and a pair of leg members straddling the framework longitudinally thereof, and having axle bushings for carrying track engaging pulleys therein.

7. The suspension as set forth in claim 6 wherein the yoke is adjustable by bolt means threaded through the second axle to bear against the central member of the yoke and thus provide rearward adjustment of the track as it is carried around the pulleys.

8. The suspension as set forth in claim 7 wherein the framework includes a transverse plate at the rearward end thereof, which plate carries bolt means for adjusting the position of the second axle such as to effect adjustment of the belt mounted between the first and second axle pulleys.

9. In a track type vehicle having a body with forward and rearward defined ends, steering means at the forward end, an endless flexible reinforced elastomeric track having drive lug inside surfaces and ground engaging outside surfaces and positioned on the longitudinal axis of the vehicle for propelling the vehicle from substantially the rearward end, motor and associated drive means at the forward end for engagement with and to drive said track, a suspension associated with the track and the vehicle body comprising:

a framework having forward and rearward ends and comprised of longitudinal and transverse support members, said framework positioned on the longitudinal axis and within the inside pathway of the track;

means at the forward and rearward ends of the framework for attaching said framework to the vehicle body;

a first axle and pulley means mounted at the forward end of the framework;

a second axle and pulley means mounted at the rearward end of the framework;

a yoke structure comprising a central member adjustably mounted to transverse support members at the rearward end of the framework and a pair of leg members straddling the framework and carrying respective track engaging pulleys thereon; and at least two endless belts mounted between and carried by the first and second axle pulleys and positioned on either side of the longitudinal axis of the track to engage the track on its bottom inside surface so as to be driven by the track, at substantially the same speed as the track, and effecting support of the track in a manner to hold the track to the ground, said belts being substantially rectangular fully molded elastomeric material having a pulley engaging inside surface and a track engaging outside surface, said belts having high modulus tensile cords embedded therein nearer the inside surface and substantially incompressible material outwardly of the cords and forming the outside surface.

10. The suspension as set forth in claim 9 wherein the second axle is adjustable such as to change the tension of the belt.

11. The suspension as set forth in claim 10 wherein second axle is adjustably mounted within the framework and the framework includes a rearward transverse plate having means carrying an adjusting bolt bearing against the axle to move said axle in a rearwardly direction.

12. The suspension as set forth in claim 10 wherein the second axle is adapted to carry bolt means for adjusting the yoke in a rearwardly direction.

13. The suspension as set forth in claim 9 wherein the incompressible material comprises at least 50% of the surface-to-surface thickness of the belt and is siped to form blocks which pass around the pulleys in a flexible manner but which when straightened along the inside surface of the track abut in an end-to-end relationship to provide an anti-backbend characteristic to the belt to resist upward movement of the track.

14. The suspension as set forth in claim 9 wherein the belts are notched to match the sequence of lugs on the inside surface of the track such as to engage the lugs, the engagement of the lugs and notches and the separation of the track reinforcement and the belt cords combining to effect an anti-backbend characteristic that resists upward movement of the track.

15. The suspension as set forth in claim 9 wherein the means for attaching the framework to the vehicle body comprises two forward bushing mounts interconnected by a transverse bar and two rearward bushing mounts interconnected by a transverse bar, said bushing mounts attached to the vehicle body while the transverse bars are connected to the suspension framework through spring means that provide shock insulation of the vehicle body from the suspension framework.

16. The suspension as set forth in claim 15 wherein the suspension further comprises at least one piston type shock absorber interconnected between a rearward transverse support member on the framework and the transverse bar of the rearward bushing mounts.

* * * * *